United States Patent [19]

Riutta

[11] Patent Number: 5,312,465
[45] Date of Patent: May 17, 1994

[54] FILTRATION APPARATUS WITH BAG-LIKE PLENUM CHAMBER

[76] Inventor: Raine Riutta, 1727 Island Avenue, Vancouver, British Columbia, Canada, V5P 2S5

[21] Appl. No.: 31,110

[22] Filed: Mar. 12, 1993

[51] Int. Cl.$^5$ ............................................. B01D 50/00
[52] U.S. Cl. ......................................... 55/320; 55/356; 55/364; 55/471; 55/472; 55/473; 55/521
[58] Field of Search ................. 55/315, 320, 356, 364, 55/385.2, 471, 472, 473, 483, 497, 521

[56] References Cited

U.S. PATENT DOCUMENTS

| | | | |
|---|---|---|---|
| 3,995,414 | 12/1976 | Kew et al. | 55/364 X |
| 4,909,815 | 3/1990 | Meyer | 55/356 X |
| 5,163,985 | 11/1992 | Chen | 55/356 |

OTHER PUBLICATIONS

Bodyshop Magazine, Fit & Finish, 1988, p. 28.
BodyShop Business' Blue Print, Clean Shop ad, Apr. 1988, p. 87.
BodyShop Business' Blue Print, Designing Clean Air Right into Your Shop, Apr. 1989, p. 25.
Chilton's ABRN, New Line of Downdraft Spraybake Prep Stations, Jan. 1991, p. 51.
Pro-Prep Work Stations, drawings of models PWS 6002, PWS 6502, PWS 6003 and PWS 6503, undated, p. 34.
Downdraft Mobile Prep Station, undated.
Blowtherm Brochure in Japanese, undated.

*Primary Examiner*—Charles Hart
*Attorney, Agent, or Firm*—Norman M. Cameron

[57] ABSTRACT

An air filtering apparatus includes a fan body having an air intake and an air outlet. There is a fan within the body which draws air into the intake and forces it out of the outlet. There is at least one air filter between the intake and the outlet. A plenum chamber is connected to the fan body about the air outlet. The plenum chamber is a flexible bag of a sheet-like material which is inflated by air forced out of the outlet of the fan body. At least a portion of the plenum chamber is an air diffuser for air exiting the apparatus. The diffuser is more permeable than the filter.

20 Claims, 3 Drawing Sheets

FILTRATION APPARATUS WITH BAG-LIKE PLENUM CHAMBER

BACKGROUND OF THE INVENTION

1. Field of the Invention

The invention relates to air filters, particularly portable air filtration apparatuses intended to filter dust in industrial and commercial establishments.

2. Description of Related Art

Many types of air filtration apparatuses have been developed for use in commercial and industrial establishments such as autobody repair shops. Some such units include a horizontally extending overhead duct where the final filtering is performed and from which the air is discharged downwardly. The air then picks up dust particles and is subsequently recirculated by being drawn into the intake of the unit.

Some such filtering apparatuses use rigid ducts which are hung from hangers connected to the ceiling. There are also portable units where the horizontal duct is permanently attached to the filtering apparatus.

Some prior art apparatuses are inconvenient in that they must be permanently installed and therefore cannot be moved about to different positions as required. Some portable units are relatively expensive and do not offer maximum recirculation of air because the reach of the horizontal duct carrying the overhead filter is relatively limited.

U.S. Pat. No. 5,163,985 to Chen shows a movable industrial dust collector having a filtration bag which extends upwardly from the unit. However, the bag is required to act as a filter and thus cannot function optimally to diffuse the air discharged from the unit.

Accordingly, it is an object of the invention to provide an improved filtering apparatus for autobody shops and the like which provides for recirculation of the air, but does not require permanently installed, horizontal overhead ducts.

It is also an object of the invention to provide an improved filtering apparatus of the type where the air from an overhead duct can be discharged downwardly at an appreciable distance away from the fan body of the unit.

It is a further object of the invention to provide an improved filtering apparatus of this type which is relatively simple and economical, but offers improved performance over prior art apparatuses.

SUMMARY OF THE INVENTION

In accordance with these objects, the invention provides an air filtering apparatus having a fan body with a top, a bottom, an air intake and an air outlet. There is a fan within the body for drawing air into the intake and forcing it out of the outlet. There is at least one air filter between the intake and the outlet. A plenum chamber is connected to the fan body about the air outlet. The plenum chamber is a flexible bag of a sheet-like material which is inflated by air forced out of the outlet of the fan body. At least a portion of the plenum chamber is an air diffuser for air exiting from the apparatus. The diffuser is more permeable than the air filter.

DESCRIPTION OF THE PREFERRED EMBODIMENTS

Figure 1:
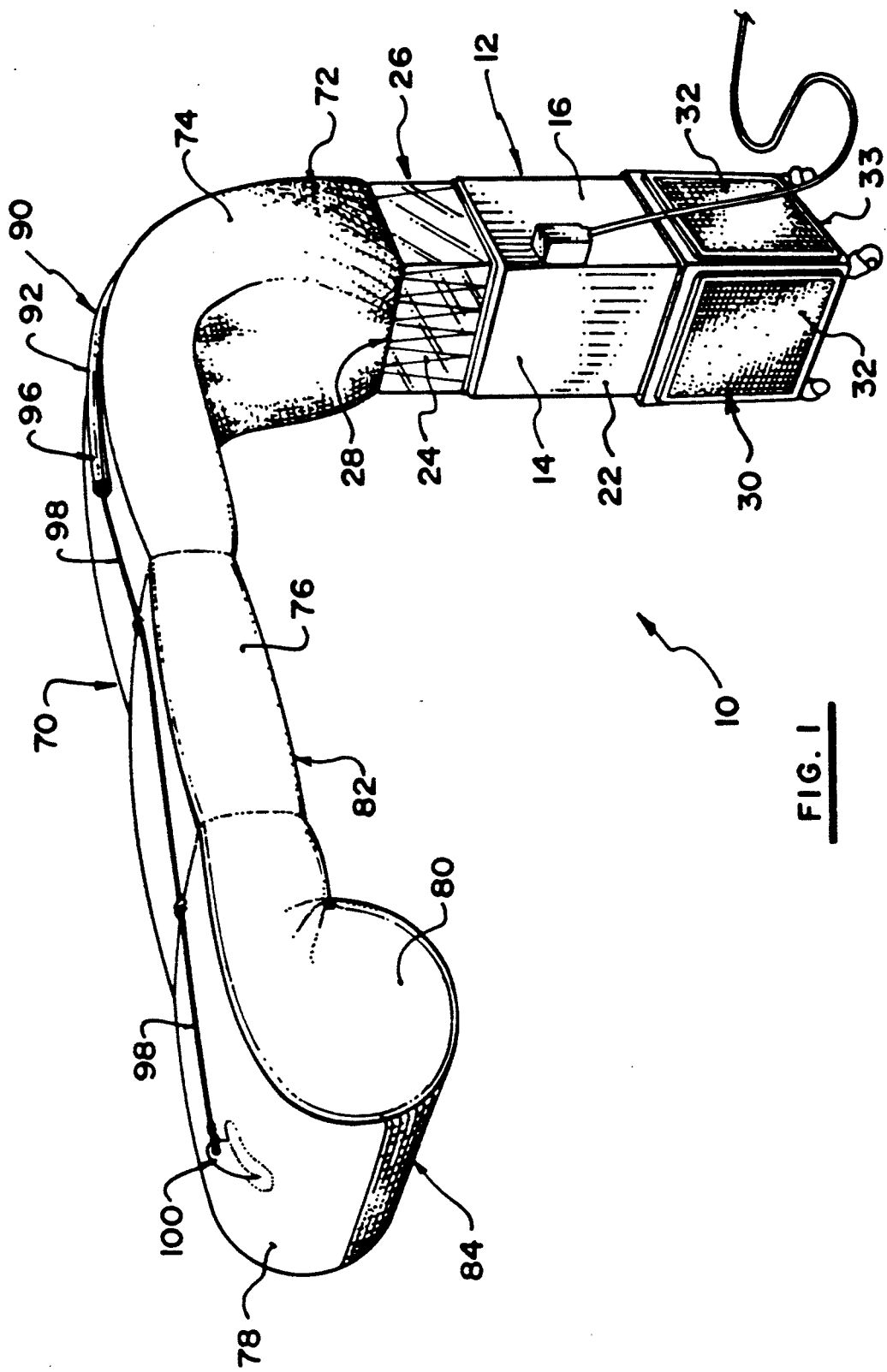
FIG. 1 is a front, side isometric view of an air filtering apparatus according to a first embodiment of the invention.
Figure 2:
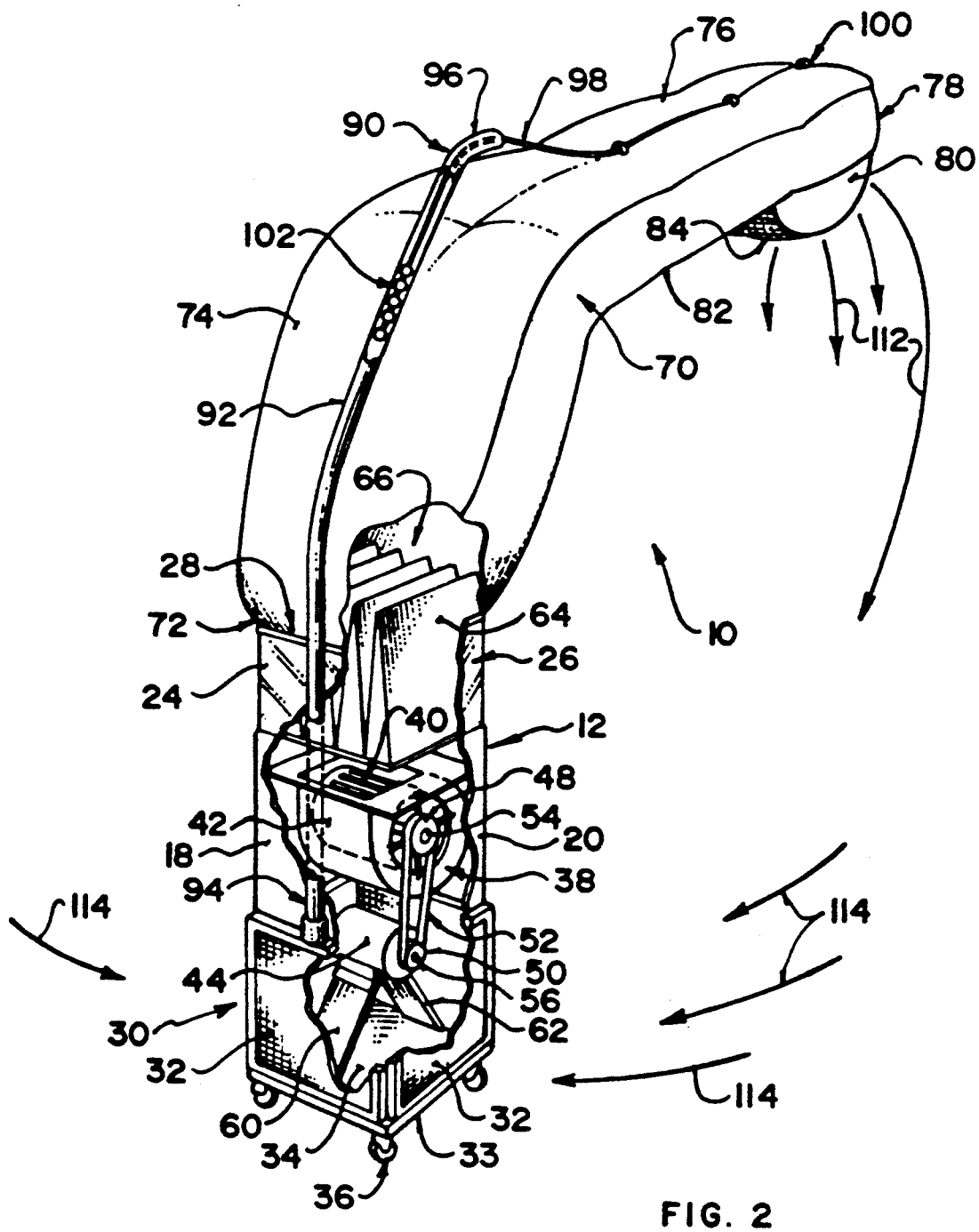
FIG. 2 is a rear, side isometric view thereof with the fan body partly broken away to show interior components thereof.

Referring first to FIG. 1 and FIG. 2, these show a filtering apparatus generally at 10. The apparatus includes a fan body 12 having four sides 14, 16, 18 and 20. The mid section of each side is a closed panel, such as panel 22 on side 14. Each such panel is rectangular in this embodiment and made of sheet metal although alternative materials could be used instead. The upper portion of each side has a second panel, such as panel 24 on side 14. This panel is rectangular in this embodiment and of rigid, transparent acrylic, although alternative materials could be employed. Panel 24 and the corresponding panels on the other sides form a single member 26 extending about top 28 of the fan body 12.

The lower portion of the fan body has an air intake, shown generally at 30, which is formed by four air filters 32, one on each of the sides. These air filters serve as primary air filters for the air drawn in through the intake of the apparatus. Each of the air filters 32 is generally rectangular in shape and may be pleated. In this instance a Type DP sold under the trade mark AIR-GUARD is used. This is manufactured by Airguard Industries, Inc. of Louisville, Ky., U.S.A. Other filters could be substituted.

The unit has a bottom 33 which is closed in this example and includes a dust collecting tray 34 shown in FIG. 2. There is a caster 36 fitted to the apparatus adjacent each corner of the bottom.

A fan 38 is located within the fan body 12 as seen in FIG. 2. In this example, the fan is model 812 Delhi Blower. The fan includes a squirrel-cage type impeller 40 rotatably mounted within a shroud 42. The fan is powered by an electric motor 44 mechanically coupled to the impeller by means of sheaves 48 and 50 fitted to shaft 54 of the impeller and shaft 56 of the motor and by a V-belt 52 fitted over the sheaves. Alternative types of fans and alternative means for coupling the fan to a motor could be employed in other embodiments of the invention. The motor 44 is mounted on a pair of struts 60 and 62 within the fan body.

There is a secondary, pocket filter 64 within the fan body adjacent top 28 which is located adjacent the transparent panels 24 so that the condition of the filter can be viewed. This example uses a Pocket Filter Type F45 sold under the trade mark VILEDON by Freudenberg Nonwovens Inc. of Birmingham, Mich., U.S.A. Other filters could be substituted.

The fan body has an air outlet 66 which is rectangular in shape and is formed by the opening in the body above filter 64. A bag-like plenum chamber 70 has a proximal end 72 connected to the top of the fan body about the air outlet 66. Thus the air drawn in through intake 30 is forced out of the fan body through outlet 66 into plenum chamber after being filtered by primary filters 32 and secondary filter 64. The plenum chamber has a body 72 made of a closely woven textile, spinnaker cloth of polyester in this embodiment. However, alternative flexible, lightweight, sheet-like materials could be used including non-woven plastic sheeting for example.

The plenum chamber has a vertically extending, first portion 74 which is inclined upwardly and outwardly away from the outlet 66 as best seen in FIG. 2. Portion 74 is connected to a horizontal, cantilevered portion 76 which extends outwardly from portion 74 to distal end 78 of the plenum chamber. The plenum chamber is substantially rectangular in section and has a drum-shaped portion 80 extending transversely across distal end 78. The plenum chamber has a bottom 82 which is fitted with an air diffuser 84 on portion 80 adjacent the distal end 78. The air diffuser in this embodiment is formed by a loosely woven fabric mesh. However, other foraminous panels could be substituted, such as panels of the same material as the rest of the plenum chamber with a plurality of apertures punched therethrough. Closely spaced-apart strips of material or non-woven fibre mats are other possibilities. The diffuser is significantly more permeable than the filters in the fan body.

Apparatus 10 also includes a retractor 90 connected to the plenum chamber. The retractor include a support member 92 formed by a curved rigid tube in this embodiment, which is connected to a base 94. The member 90 has a top 96 located above the plenum chamber 70. A cable 98 extends through the tubular member 90 and projects outwardly to a tab 100 connected to distal end 78 of the plenum chamber. As seen in FIG. 2, a series of weights 102 are connected to the opposite end of the cable within member 90.

In operation, dust laden air is drawn into the unit through the four filters 32 at the bottom of the fan body which serve as primary filters. The fan forces the air upwardly out of the fan body through the secondary filter 64 which filters particles as small as three microns. The air is then forced under pressure through plenum chamber 70. The size and nature of diffuser 84 is related to the capacity of the fan such that air pressure is built up within the plenum chamber during normal operation of the air filtering apparatus 10. This air pressure is sufficient to distend plenum chamber 70 and provide the sole means for maintaining the shape and position of the plenum chamber as illustrated in FIGS. 1 and 2.

When the fan is not operational, air pressure is lost in the plenum chamber and portion 76 would tend to drop towards the floor. However, weights 102 within the support member 92 drop and draw tab 100 towards top 96 of the member so as to retract the deflated plenum chamber and keep it from falling on the floor.

The embodiment of FIG. 1 and FIG. 2 achieves a recirculated type of airflow as shown best in FIG. 2. Clean air is forced out of the apparatus from diffuser 84 as shown by arrows 112 in FIG. 2. The air picks up dust from the environment and is recirculated back into the apparatus as identified by arrows 114.

Figure 3:
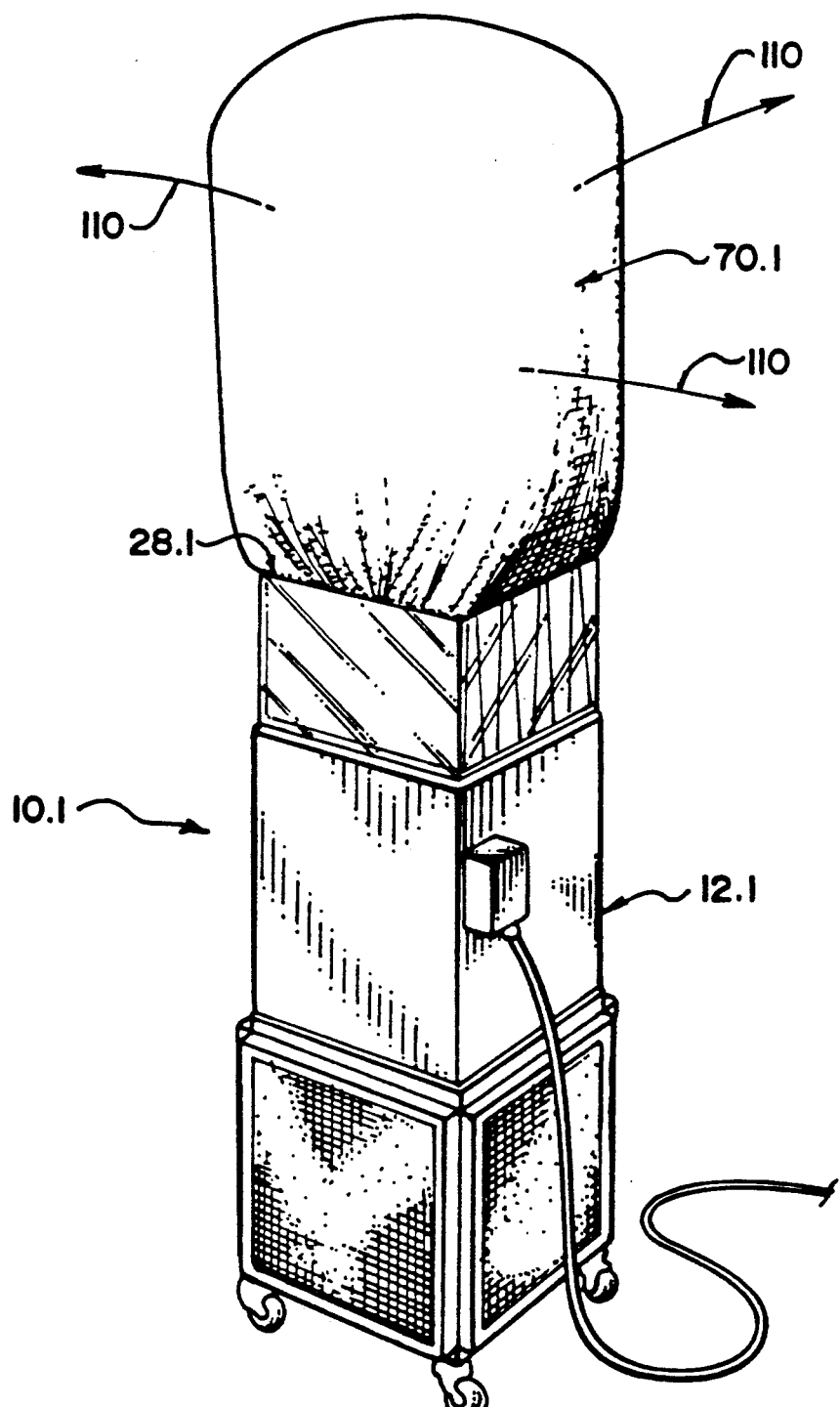
FIG. 3 is a front, side isometric view of an air filtering apparatus according to a second embodiment of the invention.

An alternative air filtering apparatus 10.1 is shown in FIG. 3. Its fan body 12.1 is the same as fan body 12 of the embodiment of FIGS. 1 and 2 and therefore is not described in more detail. However, its plenum chamber 70.1 is significantly different in shape and configuration compared to plenum chamber 70 of the previous embodiment. In this instance, there is no cantilevered, horizontal portion. Instead, the plenum chamber is substantially cylindrical in shape and extends vertically upwards from top 28.1 of the fan body when the fan is operational. A loosely woven lightweight polyester fabric is used in this example. Again, the shape of the plenum chamber is due to air pressure built up within the plenum chamber from the fan. in this embodiment, the entire plenum chamber 70.1 is of a foraminous fabric and thus the whole plenum chamber serves as a diffuser. The effect is to diffuse air outwardly from the apparatus 10.1 as illustrated by arrows 110 without creating air turbulence due to the rapid speed of the air being pushed out of the fan.

However, it should be emphasized that the plenum chamber is a diffuser and not a filter. It is significantly more permeable than the secondary air filter at least so the dust is removed before the air enters the plenum chamber. Thus, the function of the plenum chamber as a diffuser is not compromised by requiring it to filter the dust.

It will be understood by someone skilled in the art that many of the details provided above are by way of example only and are not intended to limit the scope of the invention which is to be interpreted with reference to the following claims.

What is claimed is:

1. An air filtering apparatus, comprising
   a fan body having a top, a bottom, an air intake, an air outlet, a fan within the body for drawing air into the intake and forcing it out of the outlet, and at least one air filter between the intake and the outlet; and
   a plenum chamber connected to the fan body about the air outlet, the plenum chamber being a flexible bag of a sheet-like material which is inflated by air forced out of the outlet of the fan body, at least a portion of the plenum chamber being an air diffuser for air exiting the apparatus, the diffuser being more permeable than said at least one filter.

2. An apparatus as claimed in claim 1, wherein the plenum chamber extends vertically upwards from the air outlet when the apparatus is operating, the entire chamber being said diffuser.

3. An apparatus as claimed in claim 1, wherein the plenum chamber includes a cantilevered portion with a top and a bottom and which extends horizontally above the top of the fan body when the apparatus is operating, the plenum chamber being distended by air exiting the air outlet of the fan body.

4. An apparatus as claimed in claim 3, wherein the plenum chamber is elogated and has a proximal end connected to the fan body and a distal end which is remote from the fan body.

5. An apparatus as claimed in claim 4, wherein the diffuser is on the bottom of the cantilevered portion of the plenum chamber and adjacent the distal end thereof.

6. An apparatus as claimed in claim 5, wherein the diffuser is foraminous.

7. An apparatus as claimed in claim 6, wherein the diffuser is a screen.

8. An apparatus as claimed in claim 4, wherein the plenum chamber includes a vertically extending portion between the proximal end and the cantilevered portion.

9. An apparatus as claimed in claim 8, wherein the vertically extending portion extends upwardly and outwardly away from the fan body when the apparatus is operating.

10. An apparatus as claimed in claim 3, having a retractor connected to the cantilevered portion which retracts the plenum chamber towards the fan body when the apparatus is not operating.

11. An apparatus as claimed in claim 10, wherein the retractor includes a support member connected to the fan body and extending above the plenum chamber, a flexible tension member connected to the plenum chamber and means for retracting the tension member towards the support member.

12. An apparatus as claimed in claim 11, wherein the means for retracting comprises one or more weights connected to the tension member.

13. An apparatus as claimed in claim 1, wherein the air intake is adjacent the bottom of the fan body and includes a primary air filter.

14. An apparatus as claimed in claim 13, wherein the body has four sides, the intake being on each side and including a primary air filter on each side.

15. An apparatus as claimed in claim 1, wherein the fan includes a squirrel cage impeller and a motor mechanically coupled to the impeller.

16. An apparatus as claimed in claim 13, having a secondary air filter in the fan body adjacent the top thereof, the fan being between the primary air filter and the secondary air filter.

17. An air filter apparatus, comprising:
   a fan body having a top, a bottom, four sides, an air intake about the four sides adjacent the bottom, primary air filters adjacent the air intake along each said side, a fan within the body, an air outlet on the top of the body, and a secondary air filter on the top of the body adjacent the air outlet; and
   a flexible, bag-like plenum chamber having a proximal end connected to the top of the fan body about the outlet, the chamber having a vertically extending portion extending upwardly away from the outlet when the apparatus is operational, a cantilevered portion extending horizontally outwards from the vertically extending portion when the apparatus is operational and an air diffuser on an end of the cantilevered portion which is distal the fan body, the air diffuser being more permeable than the air filters.

18. An apparatus as claimed in claim 17, wherein the cantilevered portion has a bottom, the diffuser being a screen on the bottom of the cantilevered portion.

19. An apparatus as claimed in claim 17, wherein the plenum chamber, apart from the diffuser, is of a tightly woven textile.

20. An apparatus as claimed in claim 17, wherein the plenum chamber is supported by air pressure therewithin when the apparatus is operational.

* * * * *